(12) United States Patent
Zhu

(10) Patent No.: US 7,684,758 B2
(45) Date of Patent: Mar. 23, 2010

(54) SYSTEM AND METHOD OF REDUCING INTERFERENCES IN WIRELESS COMMUNICATION NETWORKS

(75) Inventor: Jing Zhu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 11/605,085

(22) Filed: Nov. 27, 2006

(65) Prior Publication Data
US 2008/0125160 A1    May 29, 2008

(51) Int. Cl.
*H04B 1/00* (2006.01)
(52) U.S. Cl. ............. 455/63.1; 455/114.2; 455/278.1; 455/296; 375/240.27; 370/333
(58) Field of Classification Search ............ 455/522, 455/63.1, 114.2, 278.1, 296, 13.4, 127.1; 375/240.27; 370/333
See application file for complete search history.

(56) References Cited

U.S. PATENT DOCUMENTS

| | | | |
|---|---|---|---|
| 7,349,720 B2 * | 3/2008 | Sandhu | 455/562.1 |
| 7,424,268 B2 * | 9/2008 | Diener et al. | 455/62 |
| 2004/0028003 A1 * | 2/2004 | Diener et al. | 370/319 |
| 2004/0203398 A1 * | 10/2004 | Durrant | 455/63.1 |
| 2005/0153702 A1 * | 7/2005 | Cuffaro et al. | 455/452.1 |
| 2008/0008133 A1 * | 1/2008 | Zhu et al. | 370/332 |
| 2009/0137206 A1 * | 5/2009 | Sherman et al. | 455/41.2 |

* cited by examiner

*Primary Examiner*—Minh D Dao
(74) *Attorney, Agent, or Firm*—Cool Patent, P.C.; Joseph P. Curtin

(57) ABSTRACT

A system and method of reducing interference in a wireless communication network is disclosed. The method comprises adapting a transmission power of a signal of a wireless communication device when a clear channel assessment threshold equals a predetermined limit and a packet error rate exceeds a predetermined packet error rate threshold. In particular, the method includes increasing the transmission power of the signal when the clear channel assessment threshold equals a lower limit and the packet error rate exceeds an upper packet error rate threshold and decreasing the transmission power of the signal when the clear channel assessment threshold equals an upper limit and the packet error rate falls below a lower packet error rate threshold.

19 Claims, 3 Drawing Sheets

| T | N | R1 | R2 | Pmax | Pmin | Cmax | Cmin |
|---|---|----|----|------|------|------|------|
| 1 sec. | 100 | 20% | 10% | 20dBm | 10dBm | -62dBm | -92dBm |

200

SYSTEM AND METHOD OF REDUCING INTERFERENCES IN WIRELESS COMMUNICATION NETWORKS

FIELD OF THE INVENTION

The present invention relates generally to data transmission between wireless communication devices in wireless communication networks. In particular, the invention relates to improving network capacity by reducing interference in high density wireless communication networks.

BACKGROUND OF THE INVENTION

Wireless communication networks typically comprise many access points (APs) and associated wireless devices. This is particularly so for high density (HD) networks, such as HD wireless local area networks (WLANs). Each AP and its associated wireless devices in the network constitute a basic service set (BSS) and a typical HD network comprises many overlapping BSSs. The increasing popularity of wireless devices, such as mobile telephones, notebook computers, personal digital assistants (PDAs) and the like, place an increasing throughput demand on such networks and therefore motivation exists to increase network capacity.

However, the combined network capacity is limited due to co-channel interference (CCI) and adjacent channel saturation. To improve network capacity in networks based on carrier sensing (CS), Clear Channel Assessment (CCA) is used by wireless communication devices to mitigate interference. CCA samples the energy in the channel to determine whether the air medium is busy by comparing the incoming energy of a signal against a threshold energy level, referred to as the CCA threshold, and consequently controls how transmission and reception of signals should proceed.

In an interference-limited wireless communication network, when CCA is extremely sensitive, the collision rate between signal packets will remain very low. However, the network capacity will also remain low because of too many deferrals due to far-away cell transmission, i.e. exposed terminals. An exposed terminal is unnecessarily prevented from transmitting even though it would not have disrupted the intended transmission. As the sensitivity of CCA is reduced, the collision rate increases. Consequently, the network capacity also increases because an increasing number of transmissions are allowed. As CCA sensitivity is reduced even further, the network capacity will drop as the collision rate becomes extremely high. Hence, one known method of improving network capacity in wireless communication networks involves tuning or adapting the CCA threshold to minimise collisions or the packet error rate (PER).

However, there are some interference scenarios that can not be prevented by self CCA adaptation alone. Adapting the CCA threshold of a transmitter is effective where interference arrives prior to the signal and can be detected by the CCA of the transmitter. However, signal packets will be lost where interference arrives at the same time as the signal, the well-known collision scenario, or where interference arrives after the signal. The probability of collision where interference arrives at the same time as the signal can however be reduced by binary exponential backoff (BEB) mechanisms as defined in the Institute of Electrical and Electronics Engineers (IEEE) 802.11 standard. Nonetheless, the problem of reduced network capacity due to interference arriving after the signal, i.e. hidden terminals, remains.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Figure 1:
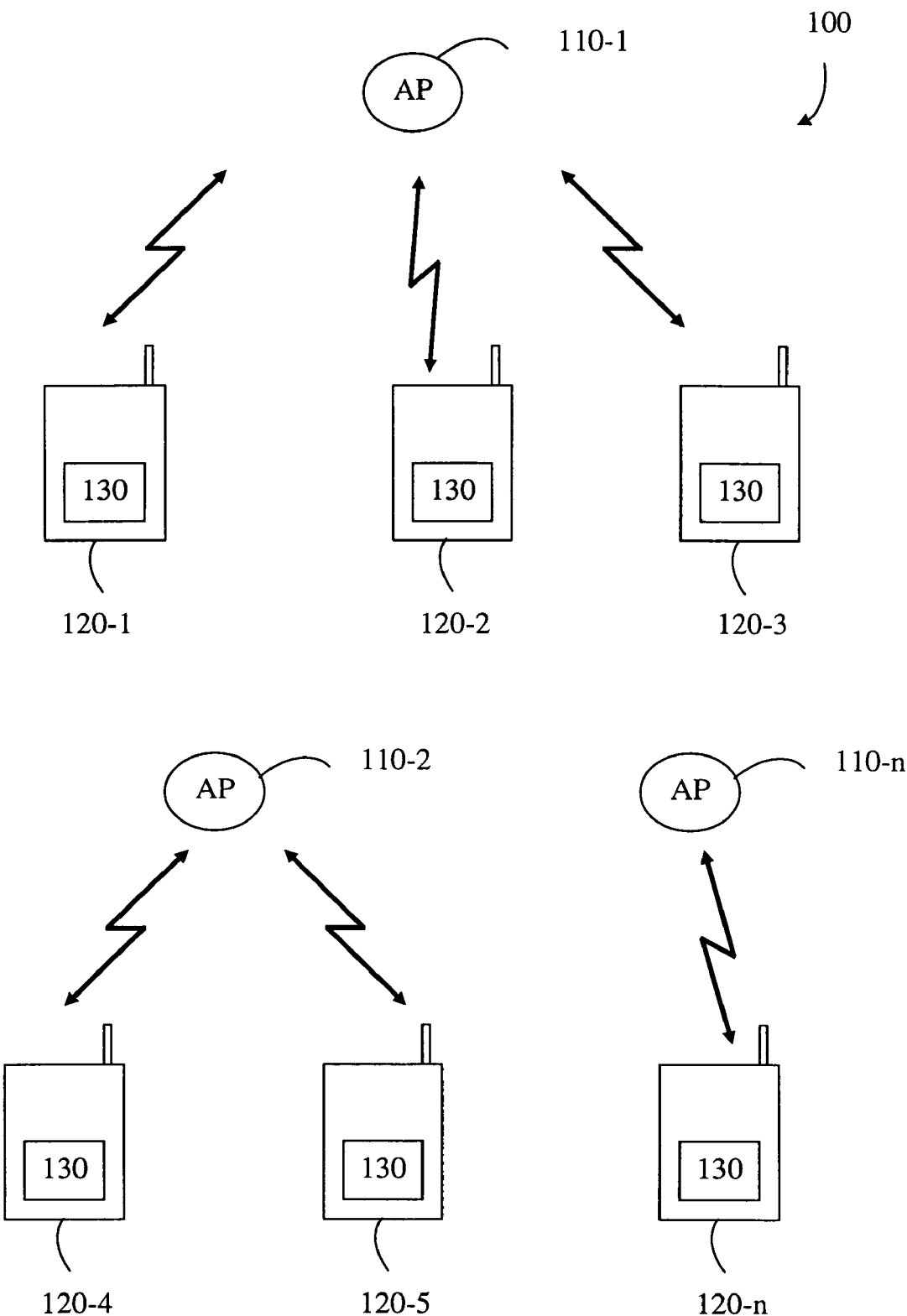
FIG. 1 is a schematic diagram illustrating a wireless communication network according to some embodiments of the present invention.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to reducing interference in a wireless communication network. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of reducing interference in a carrier sensing wireless communication network as herein described. The non-processor circuits may include, but are not limited to, a radio receiver, a radio transmitter, signal drivers, clock circuits, power source circuits, and user input devices. As such, these functions may be interpreted as a method for reducing interference in a wireless communication network. Alternatively, some or all functions could be implemented by a state machine that has no stored program instructions, or in one or more application specific integrated circuits (ASICs), in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1 and in accordance with embodiments of the present invention, a schematic diagram illustrates a carrier sensing wireless communication network 100, such as a high density (HD) wireless local area network (WLAN), which comprises one or more access points (AP) 110-$n$ (110-1, 110-2, ..., 110-$n$). Each AP 110-$n$ has one or more associated clients in the form of wireless communication devices 120-$n$ (120-1, 120-2, ..., 120-$n$), such as mobile telephones, notebook computers, personal digital assistants (PDAs), or other wireless communication devices. As described in more detail below, each wireless communication device 120-$n$ comprises computer readable program code components 130 for reducing interference in accordance with the teachings of the present invention.

The present invention provides a system and method of reducing interference in such a wireless communication network 100 by adapting a transmission power P of a signal from the wireless communication devices 120-$n$ when a clear channel assessment (CCA) threshold equals a predetermined limit and a measured packet error rate (PER) exceeds a predetermined packet error rate threshold. The general principle is to reduce the CCA threshold to reduce packet losses when interference arrives at the wireless communication devices 120-$n$ prior to the signal and to increase the transmission power of the signal when interference arrives at the wireless communication devices 120-$n$ after the signal. With reference to a current CCA threshold, if the CCA threshold has reached a minimum, packet losses are dominated by interference arriving after the signal. If the CCA threshold has reached a maximum, packet losses are dominated by interference arriving before the signal.

Parameters referred to herein in relation to the present invention include the following: N is the number of transmissions for each PER measurement; T is the maximum time for each PER measurement; R1 is the predetermined upper PER threshold for CCA adaptation; R2 is the predetermined lower PER threshold for CCA adaptation; Cmin is the lower limit of CCA threshold (dBm); Cmax is the upper limit of CCA threshold (dBm); Pmin is the lower limit of transmission power P (dBm); and Pmax is the upper limit of transmission power P (dBm).

Regarding the number of transmissions for each measurement, the measurement will restart if $\geq$N samples can not be collected within the maximum time T. Regarding the transmission power P, the lower limit Pmin of the transmission power is not necessarily the minimum transmission power available. The lower limit Pmin of the transmission power can be any desired default value of transmission power. For example, the default value of transmission power P can be set at 10 dBm, although the available minimum transmission power is −12 dBm. As a result, transmission power P will never be set lower than 10 dBm by the adaptation method of the present invention.

Figures 2, 4:
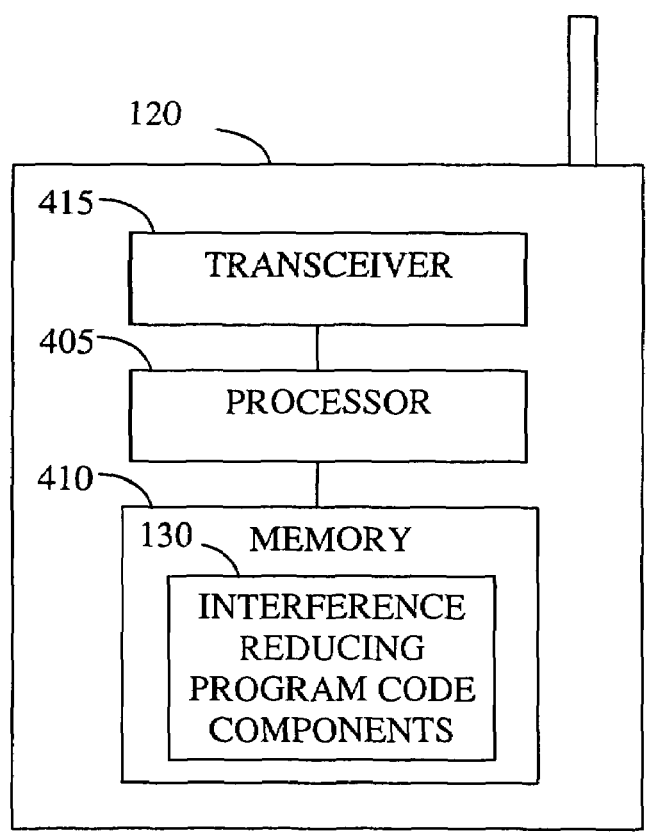
FIG. 2 shows a configuration example of parameters according to an embodiment of the present invention.
FIG. 4 is a block diagram illustrating components of a wireless communication device of the wireless communication network shown in FIG. 1, according to some embodiments of the present invention.

A configuration example 200 showing some typical values for the aforementioned parameters according to an embodiment of the present invention is shown in FIG. 2. It will be readily appreciated that other configurations are possible in which the parameters have different values. For example, the maximum measurement time T and the number of transmissions required for each measurement can vary according to the density of the wireless communication network.

Figure 3:
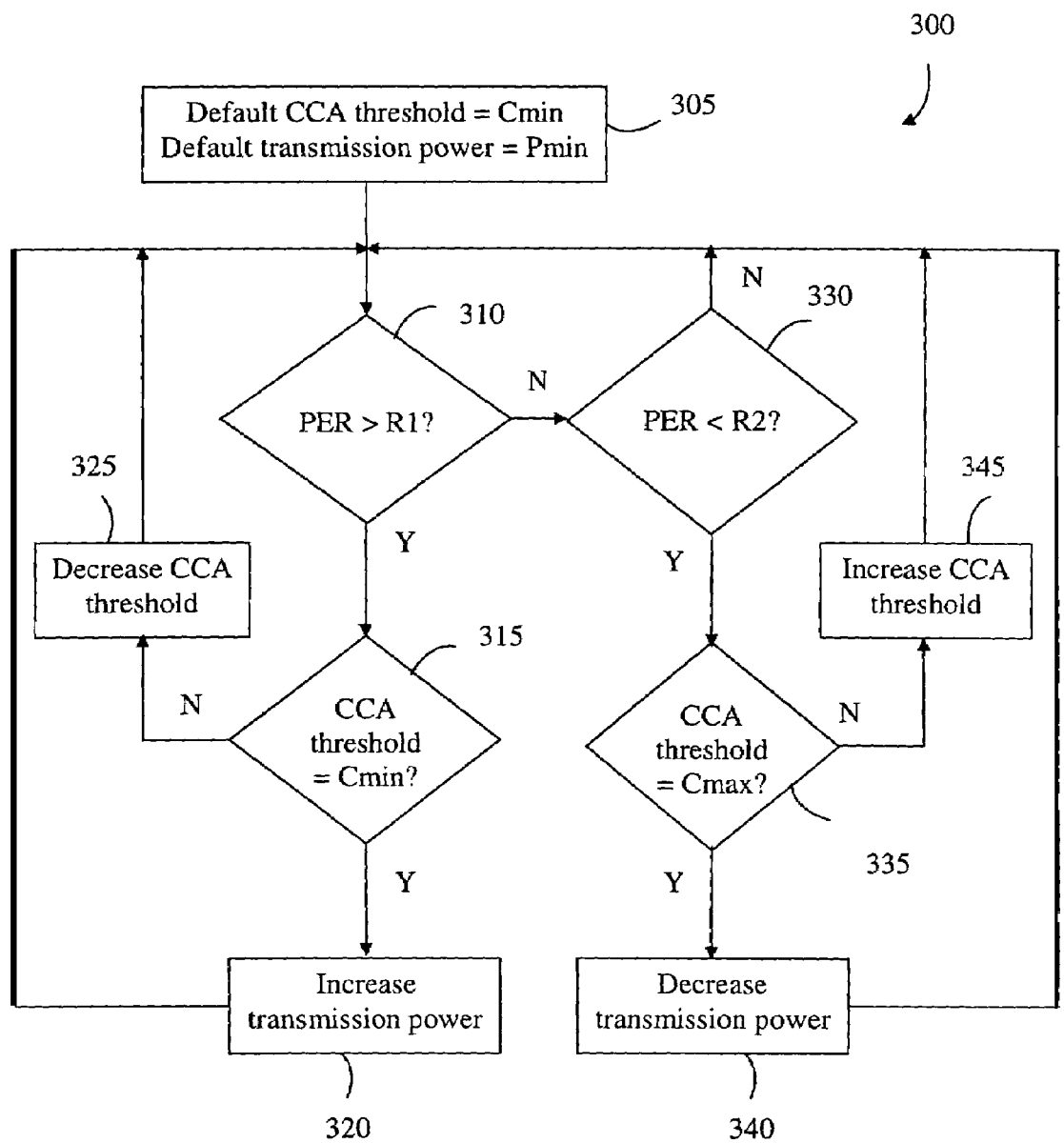
FIG. 3 is a general flow diagram illustrating a method of reducing interference in the wireless communication network shown in FIG. 1, according to some embodiments of the present invention.

Referring to FIG. 3, a general flow diagram illustrates a method 300 of reducing interference, from the perspective of a wireless communication device 120-$n$, in the wireless communication network 100, according to some embodiments of the present invention. At 305, a default CCA threshold is set to Cmin and a default transmission power is set to Pmin. At 310, in a maximum time T, the wireless communication device 120-$n$ measures whether the PER exceeds the predetermined upper PER threshold for CCA adaptation, i.e. whether PER>R1. If the measured PER is greater than R1, at 315 the wireless communication device 120-$n$ determines whether the CCA threshold is equal to the lower limit of CCA threshold, Cmin. If the CCA threshold is equal to Cmin, at 320 the method includes increasing the transmission power P of the signal. According to one embodiment, at 320 the transmission power P is increased to the minimum of the upper limit of transmission power, Pmax, and the current transmission power increased by 1 dB. The method then continues at 310.

However, at 315 of the method 300 shown in FIG. 3, if the CCA threshold is not equal to the lower limit of CCA threshold, Cmin, i.e. when the CCA threshold is greater than Cmin, at 325 the method includes decreasing the CCA threshold. According to one embodiment, at 325 the CCA threshold is decreased by 1 dB. The method then continues at 310.

With further reference to FIG. 3, at 310, if the measured PER is not greater than R1, at 330 the wireless communication device 120-$n$ measures whether the PER is less than the predetermined lower PER threshold for CCA adaptation, i.e. whether PER<R2. If the measured PER is less than R2, at 335 the wireless communication device 120-$n$ determines whether the CCA threshold is equal to the upper limit of CCA threshold, Cmax. If the CCA threshold is equal to Cmax, at 340 the method includes decreasing the transmission power P of the signal. According to one embodiment, at 340 the transmission power P is decreased to the maximum of the lower limit of transmission power, Pmin, and the current transmission power decreased by 1 dB. The method then continues at 310.

However, at 335 of the method 300 shown in FIG. 3, if the CCA threshold is not equal to the upper limit of CCA threshold, Cmax, i.e. when the CCA threshold is less than Cmax and greater than Cmin, at 345 the method includes increasing the CCA threshold. According to one embodiment, at 345, the CCA threshold is increased by 1 dB. The method then continues at 310.

At 330, if the measured PER is not less than the predetermined lower PER threshold for CCA adaptation, R2, the method continues at 310. Hence, when the CCA threshold is between the lower limit Cmin and the upper limit Cmax for the CCA threshold, the method includes maintaining the transmission power P of the signal at its present power level.

According to some embodiments of the present invention, the predetermined packet error rate threshold measurement carried out in time T and the packet error rate thresholds R1 and R2 are also used for adapting the CCA threshold and for adapting the transmission power P of the signal.

According to other embodiments of the present invention, where different types of interference can be measured separately, a first predetermined packet error rate threshold is used for adapting the CCA threshold and a second predetermined packet error rate threshold is used for adapting the transmission power P of the signal. For example, a packet error rate for interference arriving prior to the signal can be measured separately from a packet error rate for interference arriving after the signal. In this example, adaptation of the CCA threshold can depend on a measured packet error rate PER and its comparison with upper and lower packet error rate thresholds R1 and R2 respectively whereas adaptation of the transmission power P can depend on a different measured packet error rate, PER' and its comparison with different upper and lower packet error rate thresholds, R1' and R2' respectively.

Referring to FIG. 4, a schematic diagram illustrates components of a wireless communication device 120-n of the wireless communication network 100, according to some embodiments of the present invention. Those skilled in the art will recognize that the present invention can be embodied in a system of such a wireless communication device 120-n, for example, in the form of a mobile telephone, notebook computer, personal digital assistant (PDA), or other wireless communication device. A system of a wireless communication device 120-n can include a processor 405 such as a standard microprocessor or application specific integrated circuit (ASIC) operatively coupled to a storage medium in the form of a memory 410. The memory 410 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The computer readable medium then comprises the computer readable program code components 130 for reducing interference, at least some of which are selectively executed by the processor 405 and are configured to cause the execution of the above described method 300. Communications, such as those involved in the method 300, are then transmitted from, or received by, a transceiver 415 that is operatively coupled to the processor 405.

Advantages of the various embodiments of the present invention thus include the reduction of interference in wireless communication networks and a consequential increase in the network capacity. By virtue of jointly adapting the transmission power P of the signal and the CCA threshold according to packet error rate measurements in accordance with the embodiments of the present invention described herein, the probability of packet loss is reduced at least in the two aforementioned interference scenarios where interference arrives prior to the signal and where interference arrives after the signal. According to some embodiments, different packet error rate thresholds can be set for adapting the transmission power P of the signal and for adapting the CCA threshold to further enhance performance. The present invention is particularly useful in high density wireless communication networks where the probability of collisions is typically greater.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method comprising:
reducing interference in a wireless communication network by adapting a transmission power of a signal of a wireless communication device when a clear channel assessment threshold equals a predetermined limit and a packet error rate exceeds a predetermined packet error rate threshold.

2. The method of claim 1, further comprising:
increasing the transmission power of the signal when the clear channel assessment threshold equals a lower limit and the packet error rate exceeds an upper packet error rate threshold.

3. The method of claim 1, further comprising:
decreasing the transmission power of the signal when the clear channel assessment threshold equals an upper limit and the packet error rate falls below a lower packet error rate threshold.

4. The method of claim 1, further comprising:
maintaining the transmission power of the signal when the clear channel assessment threshold is between a lower limit and an upper limit for the clear channel assessment threshold.

5. The method of claim 1, further comprising decreasing the clear channel assessment threshold when the packet error rate is greater than an upper packet error rate threshold and the clear channel assessment threshold is greater than a lower limit for the clear channel assessment threshold.

6. The method of claim 1, further comprising increasing the clear channel assessment threshold when the packet error rate is less than a lower packet error rate threshold and the clear channel assessment threshold is less than an upper limit for the clear channel assessment threshold.

7. The method of claim 1, further comprising using the predetermined packet error rate threshold as the packet error rate threshold for adaptation of the clear channel assessment threshold and for adaptation of the transmission power of the signal.

8. The method of claim 1, further comprising measuring a first packet error rate for a first type of interference and measuring a second packet error rate for a second type of interference.

9. The method of claim 1, further comprising using a first predetermined packet error rate threshold for adapting the clear channel assessment threshold and a second predetermined packet error rate threshold for adapting the transmission power of the signal.

10. A system comprising:
computer readable program code components configured to cause reducing interference in a wireless communication network by adapting a transmission power of a signal of a wireless communication device when a clear channel assessment threshold equals a predetermined limit and a packet error rate exceeds a predetermined packet error rate threshold.

11. The system of claim 10, further comprising computer readable program code components configured to cause increasing the transmission power of the signal when the clear channel assessment threshold equals a lower limit and the packet error rate exceeds an upper packet error rate threshold.

12. The system of claim 10, further comprising computer readable program code components configured to cause decreasing the transmission power of the signal when the clear channel assessment threshold equals an upper limit and the packet error rate falls below a lower packet error rate threshold.

13. The system of claim 10, further comprising computer readable program code components configured to cause maintaining the transmission power of the signal when the clear channel assessment threshold is between a lower limit and an upper limit for the clear channel assessment threshold.

14. The system of claim 10, further comprising computer readable program code components configured to cause decreasing the clear channel assessment threshold when the packet error rate is greater than the upper packet error rate threshold and the clear channel assessment threshold is greater than the lower limit for the clear channel assessment threshold.

15. The system of claim 10, further comprising computer readable program code components configured to cause increasing the clear channel assessment threshold when the packet error rate is less than a lower packet error rate threshold and the clear channel assessment threshold is less than an upper limit for the clear channel assessment threshold.

16. The system of claim 10, further comprising computer readable program code components configured to cause measuring a first packet error rate for a first type of interference and measuring a second packet error rate for a second type of interference.

17. A processor to reduce interference in a wireless communication network by adapting a transmission power of a signal of a wireless communication device when a clear channel assessment threshold equals a predetermined limit and a packet error rate exceeds a predetermined packet error rate threshold.

18. The processor of claim 17, to increase the transmission power of the signal when the clear channel assessment threshold equals a lower limit and the packet error rate exceeds an upper packet error rate threshold.

19. The processor of claim 17, to decrease the transmission power of the signal when the clear channel assessment threshold equals an upper limit and the packet error rate falls below a lower packet error rate threshold.

* * * * *